US010601627B2

(12) United States Patent
Yi

(10) Patent No.: US 10,601,627 B2
(45) Date of Patent: Mar. 24, 2020

(54) METHOD AND APPARATUS FOR INDICATING CENTER FREQUENCY OFFSET FOR NARROWBAND UE IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/750,491

(22) PCT Filed: Sep. 2, 2016

(86) PCT No.: PCT/KR2016/009829
§ 371 (c)(1),
(2) Date: Feb. 5, 2018

(87) PCT Pub. No.: WO2017/039373
PCT Pub. Date: Mar. 9, 2017

(65) Prior Publication Data

US 2019/0036756 A1 Jan. 31, 2019

Related U.S. Application Data

(60) Provisional application No. 62/213,613, filed on Sep. 2, 2015, provisional application No. 62/234,019, filed
(Continued)

(51) Int. Cl.
*H04L 27/26* (2006.01)
*H04W 48/16* (2009.01)
(Continued)

(52) U.S. Cl.
CPC ...... *H04L 27/2659* (2013.01); *H04J 11/0069* (2013.01); *H04L 67/12* (2013.01);
(Continued)

(58) Field of Classification Search
None
See application file for complete search history.

(56) References Cited

U.S. PATENT DOCUMENTS

| | | | |
|---|---|---|---|
| 5,467,373 | A | 11/1995 | Ketterling |
| 2008/0080463 | A1 | 4/2008 | Stewart et al. |

(Continued)

FOREIGN PATENT DOCUMENTS

| | | |
|---|---|---|
| CN | 103828457 | 5/2014 |
| CN | 104254997 | 12/2014 |

(Continued)

OTHER PUBLICATIONS

PCT International Application No. PCT/KR2016/009827, International Search Report dated Dec. 12, 2016, 3 pages.

(Continued)

*Primary Examiner* — Diane L Lo
(74) *Attorney, Agent, or Firm* — Lee Hong Degerman Kang & Waimey

(57) ABSTRACT

A method and apparatus for receiving a downlink (DL) transmission in a wireless communication system is provided. A narrowband user equipment (NB UE) receives an offset between a center frequency of a system bandwidth and a center frequency of a narrowband from a network, and receives the DL transmission from the network based on the offset.

12 Claims, 12 Drawing Sheets sucarrier index (0, .. L-1)
guardband (in subcarrier)
NB-IoT carrier index = 0
inband
NB-IoT carrier index = 5
guardband (in subcarrier)
sucarrier index (L, .. 2*L-1)
NB-IoT carrier index = 10

Related U.S. Application Data on Sep. 28, 2015, provisional application No. 62/235,586, filed on Oct. 1, 2015, provisional application No. 62/238,096, filed on Oct. 6, 2015, provisional application No. 62/243,128, filed on Oct. 18, 2015, provisional application No. 62/263,740, filed on Dec. 7, 2015, provisional application No. 62/271,999, filed on Dec. 28, 2015, provisional application No. 62/276,950, filed on Jan. 10, 2016, provisional application No. 62/309,406, filed on Mar. 16, 2016.

(51) Int. Cl.

| | |
|---|---|
| ***H04W 4/70*** | (2018.01) |
| ***H04L 29/08*** | (2006.01) |
| ***H04W 72/12*** | (2009.01) |
| ***H04W 74/08*** | (2009.01) |
| ***H04J 11/00*** | (2006.01) |
| ***H04W 24/10*** | (2009.01) |
| ***H04W 36/24*** | (2009.01) |
| ***H04W 48/18*** | (2009.01) |
| ***H04W 4/80*** | (2018.01) |
| ***H04W 76/27*** | (2018.01) |
| ***H04W 72/14*** | (2009.01) |

(52) U.S. Cl.

CPC ............... *H04W 4/70* (2018.02); *H04W 4/80* (2018.02); *H04W 24/10* (2013.01); *H04W 36/24* (2013.01); *H04W 48/16* (2013.01); *H04W 48/18* (2013.01); *H04W 72/1289* (2013.01); *H04W 72/14* (2013.01); *H04W 74/0833* (2013.01); *H04W 76/27* (2018.02)

(56) References Cited

U.S. PATENT DOCUMENTS

| | | | | |
|---|---|---|---|---|
| 2012/0058772 | A1* | 3/2012 | Kazmi | H04W 72/048 455/450 |
| 2013/0003668 | A1* | 1/2013 | Xiao | H04L 5/001 370/329 |
| 2013/0053049 | A1 | 2/2013 | Al Housami | |
| 2013/0070822 | A1 | 3/2013 | Takahashi | |
| 2013/0083749 | A1 | 4/2013 | Xu et al. | |
| 2013/0089067 | A1* | 4/2013 | Ji | H04W 56/00 370/330 |
| 2013/0182680 | A1 | 7/2013 | Choi et al. | |
| 2014/0029568 | A1 | 1/2014 | Wang et al. | |
| 2015/0245378 | A1 | 8/2015 | Kim et al. | |
| 2016/0286507 | A1 | 9/2016 | Yang et al. | |
| 2017/0064685 | A1* | 3/2017 | Rico Alvarino | H04B 7/0456 |
| 2017/0273113 | A1 | 9/2017 | Tirronen et al. | |
| 2018/0160453 | A1 | 6/2018 | Lee et al. | |
| 2018/0206271 | A1* | 7/2018 | Chatterjee | H04L 5/0053 |

FOREIGN PATENT DOCUMENTS

| | | |
|---|---|---|
| EP | 1906686 | 4/2008 |
| WO | 2014003436 | 1/2014 |
| WO | 2014073940 | 5/2014 |
| WO | 2015056924 | 4/2015 |
| WO | 2015069000 | 5/2015 |

OTHER PUBLICATIONS

PCT International Application No. PCT/KR2016/009832, International Search Report dated Dec. 1, 2016, 3 pages.

Ericsson, "On NB M2M Cell Search Mechanism", 3GPP TSG GERAN Meeting #65, GP-150143, Mar. 2015, 15 pages.

Ericsson, et al., "Narrowband LTE—Cell search design", 3GPP TSG GERAN Meeting #67, GP-150783, Aug. 2015, 10 pages.

Qualcomm, "Narrow band OFDMA—Text proposal for TR", 3GPP TSG GERAN Meeting #65, GP-150118, Mar. 2015, 33 pages.

PCT International Application No. PCT/KR2016/009829, Written Opinion of the International Searching Authority dated Nov. 28, 2016, 39 pages.

Huawei, "On the specification and use of narrowbands," 3GPP TSG-RAN WG1 #82, R1-153750, Aug. 2015, 7 pages.

Panasonic, "MTC Narrowband definition and collision handling," 3GPP TSG-RAN WG1 #82, R1-153960, Aug. 2015, 8 pages.

LG Electronics, "Further details on narrowbands and frequency hopping," 3GPP TSG-RAN WG1 #82, R1-154227, 2015, 10 pages.

Lenovo, "Consideration of narrowband definition for MTC UEs," 3GPP TSG-RAN WG1 #82, R1-154496, Aug. 2015, 3 pages.

State Intellectual Property Office of the People's Republic of China Application Serial No. 201680050741.8, Office Action dated Nov. 19, 2018, 7 pages.

United States Patent and Trademark Office U.S. Appl. No. 15/756,495, Office Action dated Nov. 23, 2018, 19 pages.

United States Patent and Trademark Office U.S. Appl. No. 15/754,585, Office Action dated Apr. 17, 2019, 16 pages.

* cited by examiner

METHOD AND APPARATUS FOR INDICATING CENTER FREQUENCY OFFSET FOR NARROWBAND UE IN WIRELESS COMMUNICATION SYSTEM

CROSS-REFERENCE TO RELATED APPLICATIONS

This application is the National Stage filing under 35 U.S.C. 371 of International Application No. PCT/KR2016/009829, filed on Sep. 2, 2016, which claims the benefit of U.S. Provisional Application No. 62/213,613, filed on Sep. 2, 2015, 62/234,019, filed on Sep. 28, 2015, 62/235,586, filed on Oct. 1, 2015, 62/238,096, filed on Oct. 6, 2015, 62/243,128, filed on Oct. 18, 2015, 62/263,740, filed on Dec. 7, 2015, 62/271,999, filed on Dec. 28, 2015, 62/276,950, filed on Jan. 10, 2016, and 62/309,406, filed on Mar. 16, 2016, the contents of which are all hereby incorporated by reference herein in their entirety.

BACKGROUND OF THE INVENTION

Field of the Invention

The present invention relates to wireless communications, and more particularly, to a method and apparatus for indicating a center frequency offset for a narrowband (NB) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

SUMMARY OF THE INVENTION

The present invention provides a method and apparatus for indicating a center frequency offset for a NB UE in a wireless communication system. The present invention discusses how to create/handle a UE with limited RF capability, e.g. a NB UE, a MTC UE or a cellular internet-of-things (CIoT) UE, to receive downlink data successfully served by a wideband system bandwidth network.

In an aspect, a method for receiving, by a narrowband user equipment (NB UE), a downlink (DL) transmission in a wireless communication system is provided. The method includes receiving an offset between a center frequency of a system bandwidth and a center frequency of a narrowband from a network, and receiving the DL transmission from the network based on the offset.

In another aspect, a narrowband user equipment (NB UE) in a wireless communication system is provided. The NB UE includes a memory, a transceiver, and a processor, coupled to the memory and the transceiver, that controls the transceiver to receive an offset between a center frequency of a system bandwidth and a center frequency of a narrowband from a network, and controls the transceiver to receive a downlink (DL) transmission from the network based on the offset.

The NB UE/MTC UE/CIoT UE can receive downlink data from a network efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
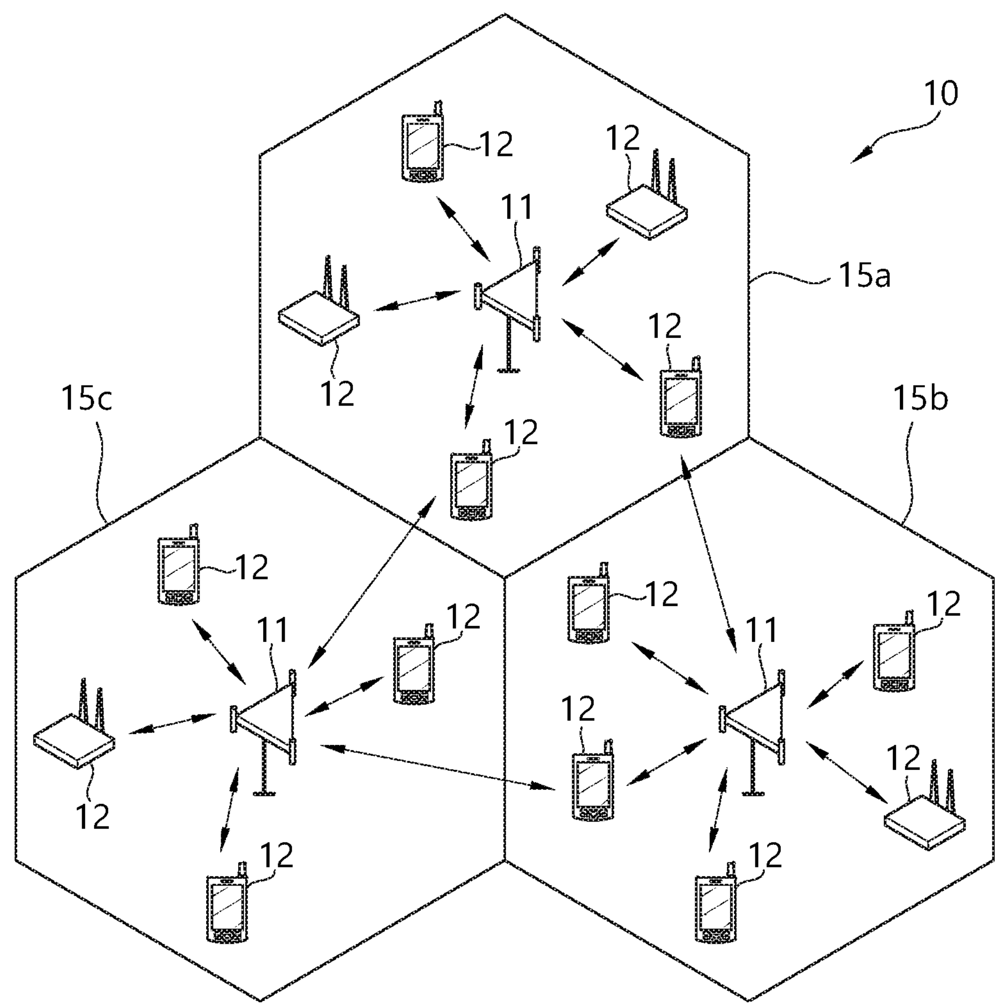
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
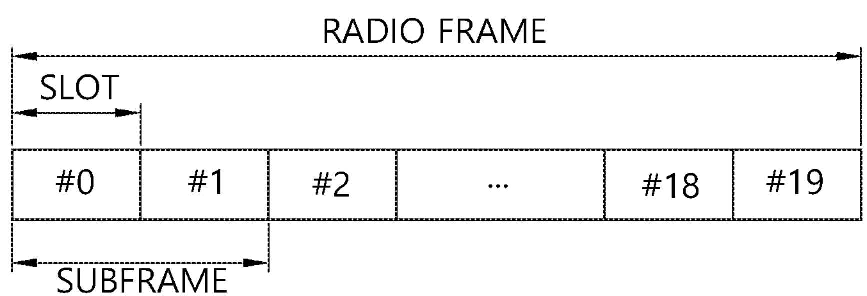
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
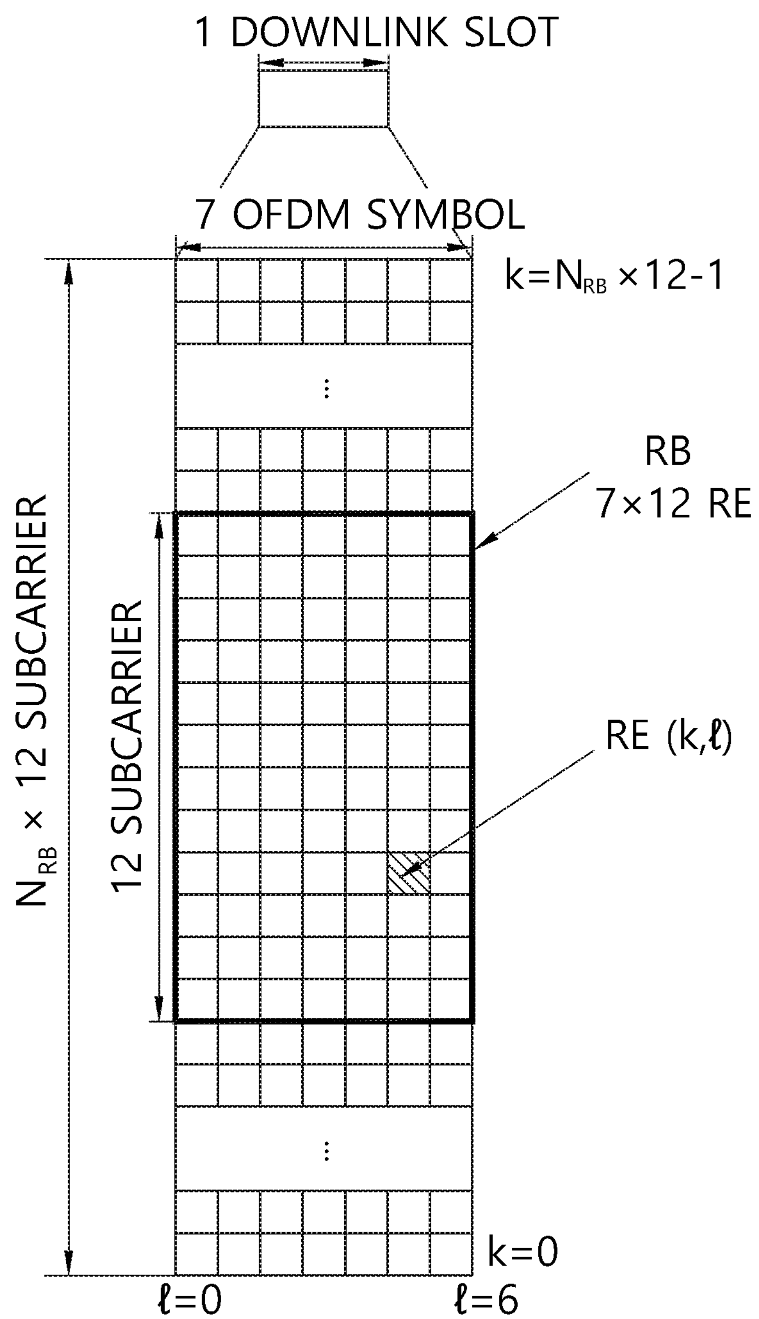
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
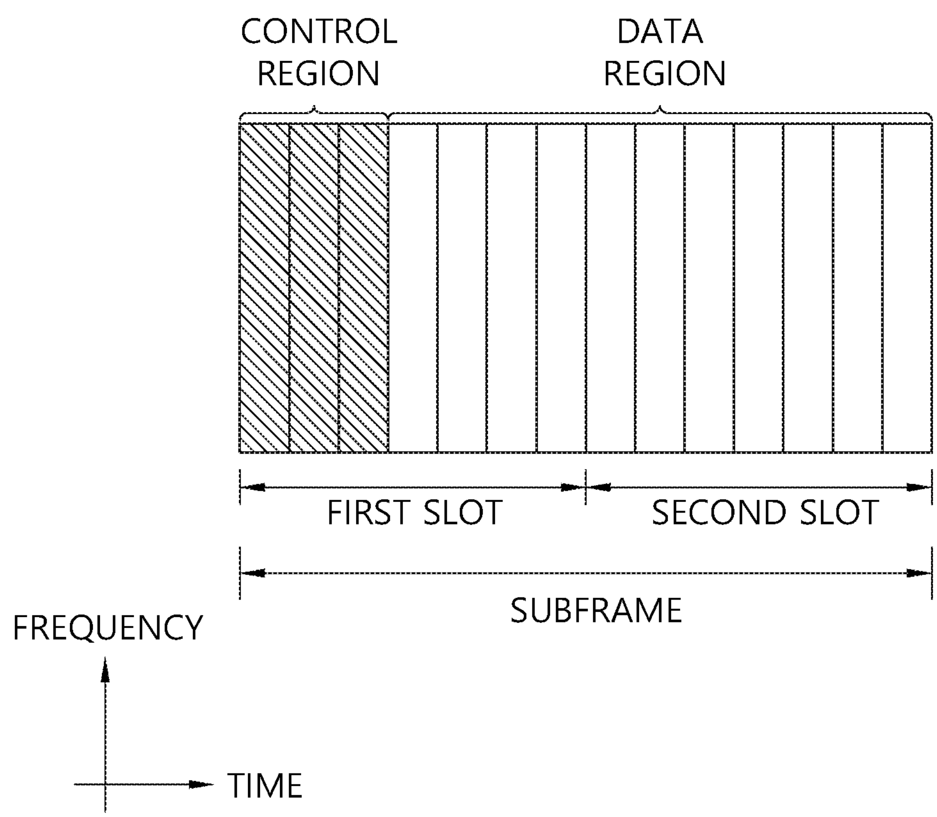
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining 01-DM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
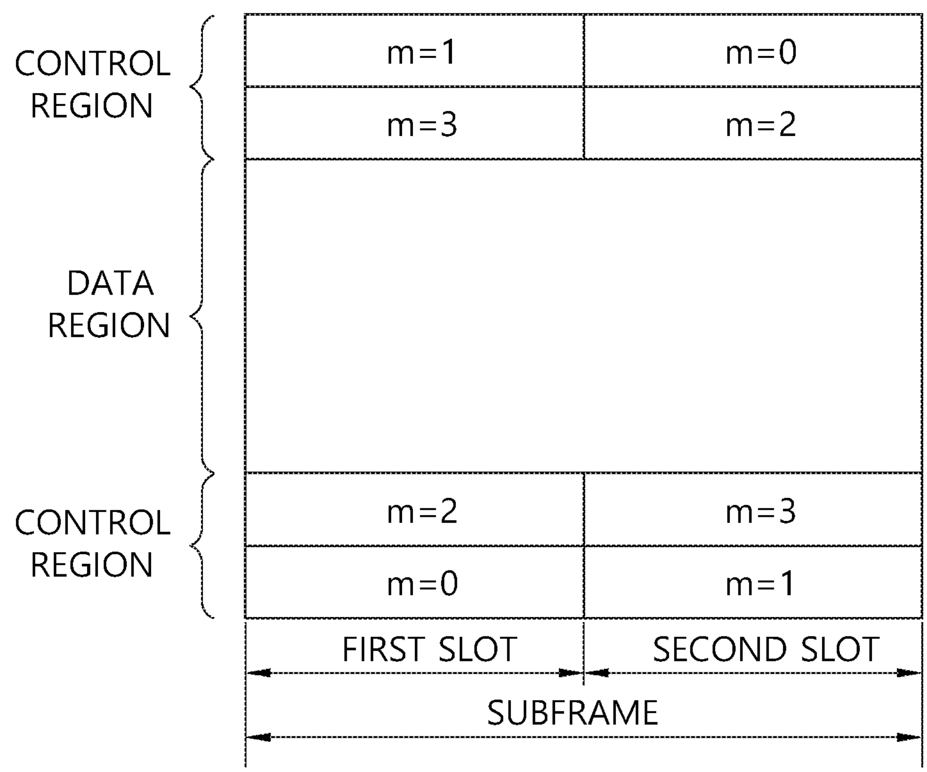
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Low complexity UEs are targeted to low-end (e.g. low average revenue per user, low data rate, delay tolerant) applications, e.g. some machine-type communications (MTC). A low complexity UE has reduced Tx and Rx capabilities compared to other UE of different categories. Among low complexity UEs, a bandwidth reduced low complexity (BL) UE may operate in any LTE system bandwidth but with a limited channel bandwidth of 6 PRBs (corresponding to the maximum channel bandwidth available in a 1.4 MHz LTE system) in DL and UL. A BL UE may a transport block size (TBS) limited to 1000 bit for broadcast and unicast.

When a UE performs initial access towards a specific cell, the UE may receive master information block (MIB), system information block (SIB) and/or radio resource control (RRC) parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDSCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

Hereinafter, a MTC UE, a UE requiring coverage enhancement (CE), a low cost UE, a low end UE, a low complexity UE, a narrow(er) band UE, a small(er) band UE, a new category UE, a BL UE, or narrowband internet-of-things (NB-IoT) UE, or NB-LTE UE may have the same meaning, and may be used mixed. Or, just a UE may refer one of UEs described above. Further, in the description below, a case where system bandwidth of available cells is larger than bandwidth that new category narrowband UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Hereinafter, various aspects of the present invention are described.

1. Support for NB-LTE UEs

As described above, it is considered to further reduce the bandwidth for a NB-LTE UE from 1.4 MHz to 200 kHz (or smaller). In this case, channel such as physical broadcast channel (PBCH)/primary synchronization signal (PSS)/secondary synchronization signal (SSS) may need to be modified since they are not fitted in smaller bandwidth system. When a bandwidth less than 1.4 MHz is allocated to the NB-LTE UE and M number of PRBs (e.g. M=1) are used for the NB-LTE UE, the M number of PRBs may be placed outside of center 6 PRBs to avoid congestion due to legacy PBCH/PSS/SSS.

Accordingly, for PBCH/PSS/SSS transmission for the NB-LTE UE, the location of M number of PRBs may be prefixed. For example, the M number of PRBs right next to center 6 PRBs (aligned with system PRB mapping) may be used for PBCH/PSS/SSS transmission for the NB-LTE UE. For example, in system bandwidth of 3 MHz, the PRB having an index 3, when M=1, may be used for PBCH/PSS/SSS transmission for the NB-LTE UE. In this case, the scrambling sequence of legacy cell-specific reference signal (CRS) may be known.

Alternatively, if the location of PSS/SSS/PBCH is not fixed against the center frequency of the system bandwidth, it may be necessary to signal at least one of the following parameters if legacy CRS is used for NB-LTE UE.

- Center frequency offset: If legacy CRS is used for NB-LTE UE for DL channel transmission such as MTC PDCCH (M-PDCCH) and/or MTC PDSCH (M-PDSCH), since CRS scrambling may change based on the location of a PRB compared to the center of the system bandwidth, a NB-LTE UE may be indicated with the offset (or difference) between the center frequency of the system bandwidth and the center frequency of a narrowband where M-PSS/M-SSS/M-PBCH is transmitted.
- Alternatively, the system bandwidth and the location of PSS/SSS/PBCH within a legacy system bandwidth may be indicated.

Further, the location of successive transmission such as SIB may be placed in different narrowbands with M PRBs. To indicate the location of the different narrowbands, at least one of the following approaches may be considered.

- It may be assumed that the center frequency of a narrowband where PSS/SSS/PBCH is indicated to the NB-LTE UE as described above, the maximum number of PRBs (such as 32 PRBs) is usable for NB-LTE UE. If the system bandwidth cannot accommodate the maximum number of PRBs around the narrowband, it's up to the network not to signal those narrowbands as usable narrowbands. If system bandwidth is larger than the addressable PRBs, those PRBs may not to be used for NB-LTE UEs. This approach is more desirable considering that in-band and stand-alone operation may be supported with unified signaling.
- System bandwidth of a legacy system may be indicated and the indication based on legacy system bandwidth may be used to indicate a set of available narrowband sets.
- One set of narrowbands from multiple sets of narrowbands which may be predefined may be indicated. The one set may be defined based on the center frequency of the narrowband where PSS/SSS/PBCH is transmitted.

Thus, in general, PBCH may include at least one of followings:

- System bandwidth of a legacy system (if legacy PRB index is used)
- The center frequency offset between the narrowband of NB-LTE synchronization signals and legacy LTE synchronization signals (if legacy CRS is used for NB-LTE UEs)
- A set of subframes (e.g. 10 bits) which can be used for NB-LTE UEs
- A set of narrowbands (e.g. 16 bits) which can be used for NB-LTE UEs
- System frame number (SFN) considering longer TTI
- The narrowband index for SIB1 scheduling and/or TBS of SIB1 and/or periodicity of SIB1

If there is more than one SIB transmission, the scheduling information of other SIBs may be known based on SIB1 scheduling information or may be indicated by SIB1.

Further, the location of PBCH may be indicated by PSS/SSS. The location of PBCH may include at least one of time and/or frequency. Also, since it is desirable to align legacy PRB with narrowband, when a fixed narrowband is used for a NB-LTE UE, the NB-LTE UE may search PSS/SSS with channel raster of 100 kHz and a fixed frequency offset. In other words, if a NB-LTE UE changes to a specific frequency (e.g. F1) for a cell search, the NB-LTE UE may searches F1+fixed offset frequency, instead of F1. Then, after searching F1+fixed frequency offset, the NB-LTE UE may move to F1+fixed frequency offset+channel raster (i.e. 100 kHz). The fixed offset may be 180 kHz*3. The fixed offset may be 180 kHz*3+90 kHz. The fixed offset may be either 180 kHz*3 or 180 kHz*3+90 kHz (in other words, per each 100 kHz channel raster, a NB-LTE UE may search two candidates). For stand-alone operation, this operation may not be necessary. However, for the common design, this operation may be applied for stand-alone operation.

Further, channel raster may be changed to 10 kHz assuming that the frequency range to search can be confined, e.g. prefixed or indicated. Another approach is to use 100 kHz to search (with possibly offset).

If PBCH is used with demodulation reference signal (DM-RS) pattern, single antenna port is used for DM-RS transmission (without code division multiplexing (CDM) between two antenna ports). This may be applied at least for PBCH transmission for NB-LTE UE.

2 Channel Raster

For one aspect of channel raster, direct current (DC) subcarrier handling is described. Since DC subcarrier may not be usable for a NB-LTE UE for DL transmission, if legacy CRS pattern based on cell ID collides with location of DC subcarrier, a NB-LTE UE may rely only on additional RS for NB-LTE channels. In other words, if legacy CRS pattern collides with DC subcarrier, additional RS may always be used for NB-LTE UEs. To compensate the loss of REs due to additional RS, the basic scheduling unit may be changed.

More specifically, when 12 subcarriers are available in system bandwidth of 180 kHz, the location of DC subcarrier may be exactly at 90 kHz from the edge of the system bandwidth. In this case, the DC subcarrier may not be aligned with any subcarrier, and thus, distortion from DC subcarrier will be impacted on two subcarriers in the center of the system bandwidth. Since distortion from DC subcarrier impact on RS may impact the overall data demodulation and measurements, it is not desirable to place RS on those two subcarriers. Thus, it may be proposed not to place any RS in those subcarriers.

If DC subcarrier is placed in any subcarriers either 97.5 kHz from the edge of the system bandwidth or 82.5 kHz from the edge of the system bandwidth (i.e. not center), the rule for which subcarrier is used for DC subcarrier needs to be prefixed. In this case, from the DC subcarrier, either left or right subcarrier may have one more subcarrier. In this case, the interference from the one side with more subcarrier may be higher than the other side. Accordingly, one subcarrier may not be used (i.e. 11 subcarrier in the system with 1 subcarrier for DC subcarrier and 10 subcarriers for valid data/control signal/RS transmission). In this case, only 10 subcarriers may possibly contain any data/control signal/RS.

Another aspect to consider is the alignment with legacy PRB in an in-band scenario. Assuming channel raster of 100 kHz (common between channel raster of LTE (100 kHz) and channel raster of GSM (200 kHz)), to be aligned with PRB mapping, 5th PRB apart from the center may be a center of narrow bandwidth if 100 kHz channel raster is used. For example, if the center of the legacy system bandwidth is f0, the first alignment between PRB and channel raster may be 900 kHz which is 5th PRB from the center. Alternatively, 180 kHz may be placed with overlapping with two PRBs rather than one PRB. Even in this case, 7.5 kHz shift (either left or right) may be necessary.

In summary, to be aligned with stand-alone and in-band operation, channel raster of 100 kHz may be used and 180 kHz may be transmitted over two legacy PRBs in in-band. When this is used, if legacy CRS is used for data demodulation, a NB-LTE UE may compute the CRS based on the PRB index (first or second) where the 180 kHz system bandwidth is placed and the channel raster. For example, if channel raster of 900 kHz is used in even system bandwidth, 180 kHz may be overlapped with 5th and 6th PRBs from the center. If channel raster of 600 kHz apart from the center is used for 180 kHz, 3rd and 4th PRB from the center may be used for 180 kHz and 4th subcarriers from 4th PRB may be used for the center, i.e. not aligned with legacy PRB mapping.

For another aspect of channel raster, inter-eNB NB-IoT carrier information exchange is described. If a common channel raster is used, a number of possible candidates where NB-IoT carrier can be placed may be limited. In a system bandwidth S including guard band, it may be assumed that there are K possible locations where NB-IoT carrier can be placed. To avoid and/or mitigate inter-cell interference, each cell may advertise its intended NB-IoT carrier(s) among K possible locations. NB-IoT carrier where synchronization signals and PBCH is transmitted may be informed to other cells. Based on the above information, each eNB may adjust its power level or adapt its scheduling. When the same PRB or frequency location is selected among different cells, the location of primary NB-IoT carrier may be changed.

In in-band operation, the channel raster may be 300 kHz if it does not have to be aligned with legacy PRB mapping. If it is aligned with legacy PRB mapping, 900 kHz channel raster may be used with 7.5 kHz shift in in-band operation and 200 kHz in stand-alone operation. 900 kHz channel raster may be sufficient for odd system bandwidth. However, for even system bandwidth, additional 90 kHz shift may be further necessary to be aligned with legacy PRB. Accordingly, 900 kHz with on/off of 90 kHz offset may be used, since it is not clear whether the legacy system bandwidth is even or odd system bandwidth. Or, simply 90 kHz may be used for channel raster. Or generally, multiple of 90 kHz, or fraction of RB bandwidth or multiple of RB bandwidth may be used for channel raster.

In summary, the option for channel raster may be as follows.

- Common for stand-alone operation and in-band operation: 100 kHz+7.5 kHz offset. This offset may be additional frequency offset which a NB-TLE UE may find via cell acquisition/cell detection procedure.
- 200 kHz for stand-alone operation, and 900 kHz+7.5 kHz offset (+90 kHz or 0 blind decoding) for in-band operation
- 200 kHz for stand-alone operation, and 100 Khz for in-band operation
- 200 kHz for stand-alone operation, and 90 kHz+7.5 kHz offset for in-band operation When no subcarrier is matched around DC subcarrier, 7.5 kHz offset may not be needed.

For simplicity, channel raster of 100 kHz and 7.5 kHz offset may be used and 180 kHz may be transmitted over two PRBs in the legacy system. In this case, the CRS pattern falls in the narrowband may change depending on the PRB index (first or second) where the narrowband is placed.

When 100 kHz is used commonly for channel raster in all operation modes, depending on system bandwidth, the separation between in-band and NB-IOT carrier per system bandwidth which can be mapped with reasonable frequency offset (such as −2.75 or 7.5 kHz) may be rather limited. For example, when system bandwidth of 15 PRBs is used, the separation between the last subcarrier of in-band and the first subcarrier of the NB-IoT carrier may be 60 kHz which are the 4 subcarriers separation. When system bandwidth of 50/100 PRBs is used, 0 subcarrier separation may be possible. Overall, system bandwidth of 10 or 20 MHz may be desired for NB-IoT guard band operation. In this case, a NB-LTE UE may be able to assume 7.5 kHz frequency offset, and thus, the NB-LTE UE may be able to attempt cell detection/synchronization by applying 7.5 kHz frequency offset as well (i.e. frequency change with 100 kHz of channel raster and additionally 7.5 kHz offset).

In in-band operation, to have reasonable frequency offset, locations of PRBs where synchronization signals for NB-IoT can be transmitted may rather restricted. By detecting the frequency offset, the system bandwidth of legacy carrier may be inferred whether it is even or odd system bandwidth if some mechanism is used at the transmitter side to differentiate frequency offset from different center and frequency offset of a NB-LTE UE. As the PRB indices where NB-IoT carrier can be placed in in-band operation are rather restricted (e.g. PRB index 5 or 10 (or −5 or −10 from the center)), legacy CRS sequence may be blindly searched or assumed without any explicit signaling if the UE wants to use them. The location of NB-IoT carrier where synchronization signals are transmitted may be indicated among those available PRBs with specific frequency offset.

To allow more flexible NB-IoT carrier deployment, the correctable carrier frequency offset (CFO) range may be larger by considering initial CFO and misalignment between channel raster and center frequency of potential NB-IoT carrier. For example, 12.5 kHz difference may be also used, and the overall CFO value range may become −20.5 kHz to 20.5 kHz. Thus, very efficient CFO estimation/correction mechanism may be necessary.

If a center on the subcarrier in the middle (either one left or one right) is assumed, 7.5 kHz offset may not be necessary.

3. Whether to Utilize CRS or not for NB-LTE UE

If NB-IoT and legacy system use different cell ID, it may become challenging to know legacy CRS. Further, to utilize legacy CRS, not only the cell ID, but also the PRB location of CRS falls in the narrowband may also need to be known. In this sense, it is difficult to utilize legacy CRS in in-band operation. Thus, legacy CRS may be rate-matched such that it is handled like zero-power CRS. However, in multicast-broadcast single-frequency network (MBSFN) subframe, there is no legacy CRS present in the PDSCH region. Thus, whether to also rate-match around CRS position or not needs to be determined. To rate-match the CRS, at least one of the following parameters may be considered.

A set of valid DL subframes: This may indicate which subframe subset is available for DL transmission for NB-LTE UE. In stand-alone operation, this parameter may be omitted. If omitted, a NB-LTE UE may assume that all DL subframes are available.

A zero-power CRS pattern: This may indicate the number of CRS antenna ports. Vshift value of CRS may be signaled such that a NB-LTE UE may assume rate-matching around them. In stand-alone operation, this parameter may be omitted.

A set of subframes (from valid DL subframes) where zero-power CRS pattern is applied: The size of this bitmap may be smaller than the set of valid DL subframe, since it only signals among the valid DL subframes.

Carrier indicator field (CIF): Regardless of zero-power CRS is applied or not, the same CIF signaled by SIB may be used. To allow more resources to be used, two or more different sets may be configured with different CIFs.

If legacy CRS is used, the same RS as the additional RS may be used, with possibly different power levels. In such case, the power offset may be configured or broadcast by the cell. In other words, from a NB-LTE UE perspective, RS pattern density may be increased. When legacy CRS is used, the set of subframes where CRS is transmitted or not may be configured among valid DL subframes only to reduce the bitmap size.

The information carried in PBCH may be as follows.

SFN: Assuming that 640 ms is duration where the same PBCH is transmitted, frame number changing in 640 ms window may be signaled in PBCH.

Legacy CRS antenna port {1, 2, 4} and Vshift value: Assuming that legacy CRS is not for data demodulation of NB-LTE UE, this information may be indicated to NB-LTE UE such that NB-LT UE expects rate matching around legacy CRS.

Valid DL subframe set: To indicate subframes usable for SIB transmission, the valid DL subframe set may be indicated in PBCH. Otherwise, the location of SIB may be limited to non-MB SFN capable subframes. If this information is signaled, a NB-LTE UE may assume that legacy CRS will be present in those subframes and thus data will be rate0matched (regardless of whether CRS has been transmitted or not). A separate valid DL subframe set for other channel transmission may also be signaled from SIB if necessary. For this signaling, to minimize signaling overhead, an index among the preconfigured set of valid DL subframe sets may be indicated. For example, the preconfigured set of valid DL subframe sets may consist of 40 bits of bitmaps.

SIB1 scheduling information which includes TBS, time/frequency location(s) of SIB1 transmission.

4. Considerations of DL Basic Resource Unit (BRU)

As one cell may have more than one NB-IoT carrier or schedule NB-IoT control/data in more than one PRB in the system bandwidth including guard band, it may be necessary to define basic resource unit in time and frequency domain, and indication mechanism of different resource unit. For the convenience, the basic resource unit may be called a DL-BRU in the below description.

One DL-BRU may consist of k subcarriers and m subframes in frequency and time domain. For example, k may be 12 and m may be 6. The size of k and m may be different per coverage class or depending on the configured maximum repetition level per each channel or per UE. One DL-BRU may be a subset of 1 PRB of m consecutive legacy subframes. In other words, DL-BRU may not be defined across legacy PRB boundaries. In that sense, k may be small or equal to 12.

Two (or N) consecutive legacy PRBs may be allocated for NB-IoT carriers. The location of the first frequency location of each consecutive legacy PRBs (or NB-IoT carrier region) in PRB index term may be signaled via PBCH or SIB. If PBCH signals the information, SIB1 may be transmitted in those regions, otherwise, the same location where PBCH is transmitted may also be utilized for SIB1 transmission. NB-IoT region may also include guard band or in-band, regardless of synchronization signal transmitted in NB-IoT carrier (i.e. data NB-IoT carrier in guard-band versus synchronization NB-IoT carrier in in-band). However, NB-IoT carrier may not be aligned with legacy PRB in guard band, and the signaling may be different in in-band and guard band. Legacy system bandwidth information and the PRB index where NB-IoT synchronization carrier is placed may also be signaled to NB-LTE UE via PBCH or SIB to inform NB-IoT carrier(s). For configuring of NB-IoT region(s), the size of in-band and guard band may also be signaled. In summary, two (or N) NB IoT region information may include at least one of the followings.

In-band or guard band: Whether NB-IoT carrier is in in-band or guard-band may be signaled.

For guard band: The first subcarrier index where NB-IoT carrier starts may be signaled. The total number of possible subcarriers which can be placed in the guard band may be indexed from 0 to 1 from the lowest frequency. For guard band, one NB-IoT region may include only one NB-IoT carrier. The subcarrier index may be fixed where 0 or 1 can be instead signaled to indicate whether the guard band is used or not. As guard band can be placed in two places, two bits of guard band NB-IoT carrier usage may be considered.

For in-band: The first PRB index where NB-IoT carrier starts may be signaled. Also, the number of NB-IoT or PRBs used for NB-IoT region may also be signaled. The starting PRB index may be prefixed (e.g. PRB index=0). The same location may be assumed in the other edge of system bandwidth as well if one in-band NB-IoT region is configured.

If signaling optimization is achieved with prefixed starting subcarrier and/or PRB index, one side of the system bandwidth may be configured for NB-IoT region, and the other side of the system bandwidth may also be configured for NB-IoT region. In this case, minimum signaling may be (0 or 1) to indicate whether NB-IoT carrier exists in guard band, and (0, . . . , k) to indicate the number of NB-IoT carriers or PRBs in in-band NB-IoT region. If 0 is indicated, no NB-IoT region may be configured in DL. When this is configured, for UL, the same configuration may be to be applied. When DL and UL NB-IoT regions are commonly configured, to allow legacy PUCCH/physical random access channel (PRACH) protection, the offset value may be configured for the starting PRB index in in-band operation. In such a case, instead of assuming PRB index=0 as a starting point for DL/UL, starting PRB index may be configured. However, the offset may be configured only for UL case where PRB index=0 as the starting PRB index in DL.

Figure 6:
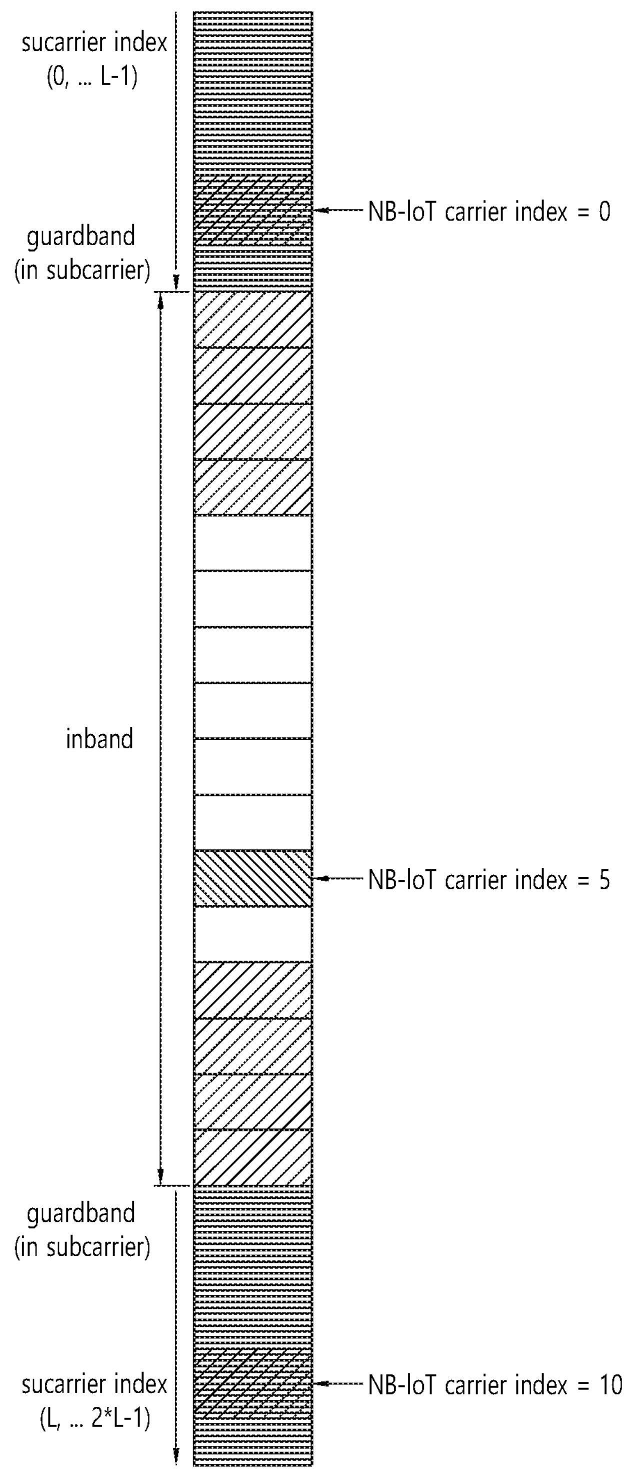
FIG. 6 shows an example of DL-BRUs according to an embodiment of the present invention.

FIG. 6 shows an example of DL-BRUs according to an embodiment of the present invention. When DL-BRU is defined, SIB may be transmitted over NB-IoT carriers. The NB-IoT carrier index may be increased from the lowest frequency to the highest frequency. If NB-IoT carrier in guard band is configured, the NB-IoT carrier index may start from 0 in guard band. The NB-IoT carrier where synchronization signal is transmitted may be counted for NB-IoT carrier indexing.

Among total P NB-IoT carriers, SIB1 may be transmitted using frequency hopping in edge NB-IoT carriers. Or, the starting NB-IoT carrier index may be selected based on cell ID and/or SFN or some information signaled in PBCH.

In terms of scheduling/configuration of DL control signal/data, DL-BSU is the basic unit of configuration/scheduling. If there are multiple DL-BSUs in frequency domain, multiple DL-BSUs may be schedulable as long as they are within one NB-IoT carrier. Alternatively, at most one DL-BSU in frequency domain may be available for scheduling at one time. In time domain, TTI expansion over multiple DL-BSUs may be supported (e.g. 2 bit indication to indicate 1, 2, 4 or 8 DL-BSUs in time-domain for scheduling one TB). The repetition may occur over one scheduling unit (i.e. if TTI is 2*DL-BSU, repetition may occur in every 2*DL-BSU in time domain). In other words, repetition may be continuously transmitted. Alternatively, repetition is may occur in the maximum TTI size (e.g. 8 DL-BSUs) to allow some multiplexing among UEs. In general, for UE processing, the maximum TTI may be defined in time-domain. However, a NB-LTE UE may be scheduled with smaller TTI to reduce UE power consumption in case of repetition. Alternatively, the maximum TTI size (or fixed TTI) may be used by utilizing coding gain and for reducing the number of repetitions. On the other hand, DL-BSU may be fixed, where one DL-BSU may be 12 subcarriers in one subframe.

Figure 7:
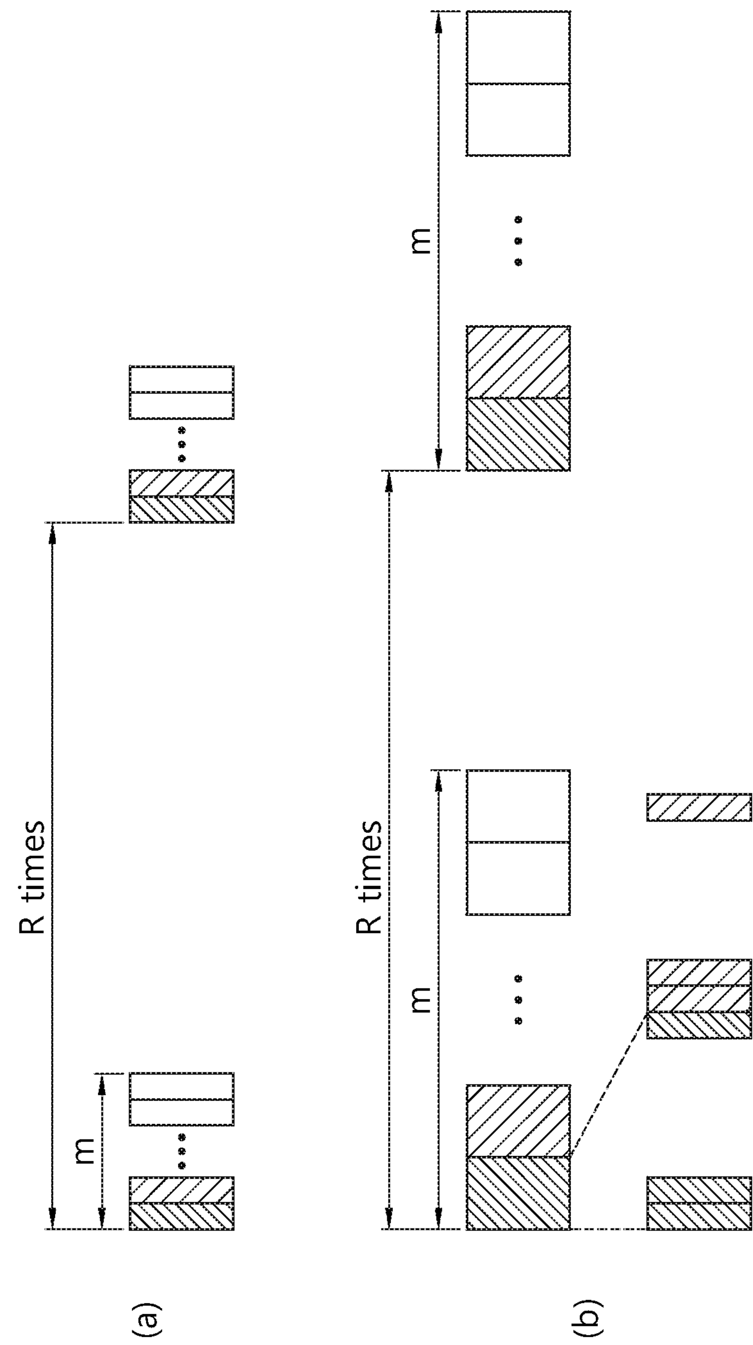
FIG. 7 shows an example of DL-BRUs according to another embodiment of the present invention.

FIG. 7 shows an example of DL-BRUs according to another embodiment of the present invention. FIG. 7-(*a*) shows a case of no-I/O combining, and FIG. 7-(*b*) shows a case of I/O combining. To allow I/O combining and/or multiple channel estimation, DL-BSU may be determined based on the repetition. For example, if repetition number is R, and the TTI size is m subframes, DL-BSU may consist of k subframes (i.e. k I/O combining), and TTI size may be increased to k*m subframe, whereas the repetition number may be decreased to R/k.

5. Handling of MBSFN

When DL-BSU is considered over m legacy subframes in in-band operation, it is possible that there are more than one MBSFN subframes in one DL-BSU. Handling of MBSFN subframe may follow at least one of the following options.

- MBSFN configuration may be indicated to NB-LTE UEs as well. In this case, some signaling overhead may be expected. The default behavior of NB-LTE UE may be the same as legacy UEs (i.e. no CRS in MBSFN subframe except for the first two 01-DM symbols). In this case, unless UE-specific RS is adopted for NB-LTE UEs, MBSFN subframe may be invalid from NB-LTE UE perspective. Alternatively, if a NB-LTE UE is also configured with additional RS transmission, MBSFN subframe may be used only with legacy CRS in first two OFDM symbols and additional RS. Alternatively, a NB-LTE UE may assume that additional RS will be transmitted in MBSFN subframe. Alternatively, a NB-LTEUE may assume that legacy CRS with additional power boosting will be transmitted in MBSFN subframe if it is configured as valid subframe. This option may be different per coverage class or different repetition level. For example, if a NB-LTE UE assumes additional RS transmission in every subframe, additional RS may be used in MBSFN subframe. If a NB-LTE UE assumes only legacy CRS in every subframe, legacy CRS pattern with additional RS may be used in MBSFN subframe.
- The network may always transmit CRS even in MBSFN subframe if the subframe is configured as valid subframe for NB-LTE UEs. This option is exactly same as legacy CRS including power, scrambling, mapping, etc. Thus, the NB-LTE UE may not aware of whether the subframe is MBSFN subframe or normal subframe.

In in-band operation, transmission of SIB(s) may be challenging if a NB-LTE UE assumes that there may be MBSFN subframes. To handle MBSFN subframes for SIB(s) transmission, one of the following options may be considered.

- No MBSFN subframe is assumed. In this case, all subframes are assumed to be available for SIB transmission. Given that SIB transmission may not occur so often (e.g. in every 1280 ms), this alternative may be feasible that the network avoids the performance loss on MBMS.
- It may be assumed that all MBSFN capable subframes are not used for SIB transmission until a valid subframe set is configured.
- Among possible configurations, PBCH may indicate which configuration is used for MBSFN subframe. For example, the possible configurations may include that all subframes are valid, or subframes #0, #4, #5, #9 in FDD are valid, and in addition, subframes #1, and #6 are also valid, etc.
- 6 bit size of bitmap may be indicated to indicate which subframes are valid for SIB transmission from one radio frame.
- Control channel to schedule SIB transmission may be adopted. The control channel may be transmitted in non-MBSFN subframes, and may dynamically indicate the available subframes and also frequency location(s) of SIB transmission.

The same information may be also applied for paging as well. If multiple NB-IoT carriers are configurable, the second option, i.e. all MBSFN capable subframes are not used for SIB transmission until a valid subframe set is configured, may be a default option, and SIB(s) may be transmitted in different NB-IoT carrier from synchronization signals.

6. SIB Transmission

To reduce the overall latency of SIB transmission, more NB-IoT carriers and transmit SIBs in different NB-IoT carriers may be considered. Given that a network may not be able to boost power up to 6 dB in more than one NB-IoT carrier, if SIB and NB-PSS/NB-SSS/NB-PBCH are transmitted at the same time in different NB-IoT carrier, power boosting of SIB transmission may be restricted. This may require more repetitions of SIB transmission. Accordingly, in this sense, SIB(s) may be transmitted at the same NB-IoT carrier where NB-PBCH/NB-PSS/NB-SSS are transmitted. However, utilizing multiple NB-IoT carriers for SIB transmission may offer frequency diversity, which may compensate the lower power boosting capability in different NB-IoT carriers from synchronization carrier.

Figure 8:
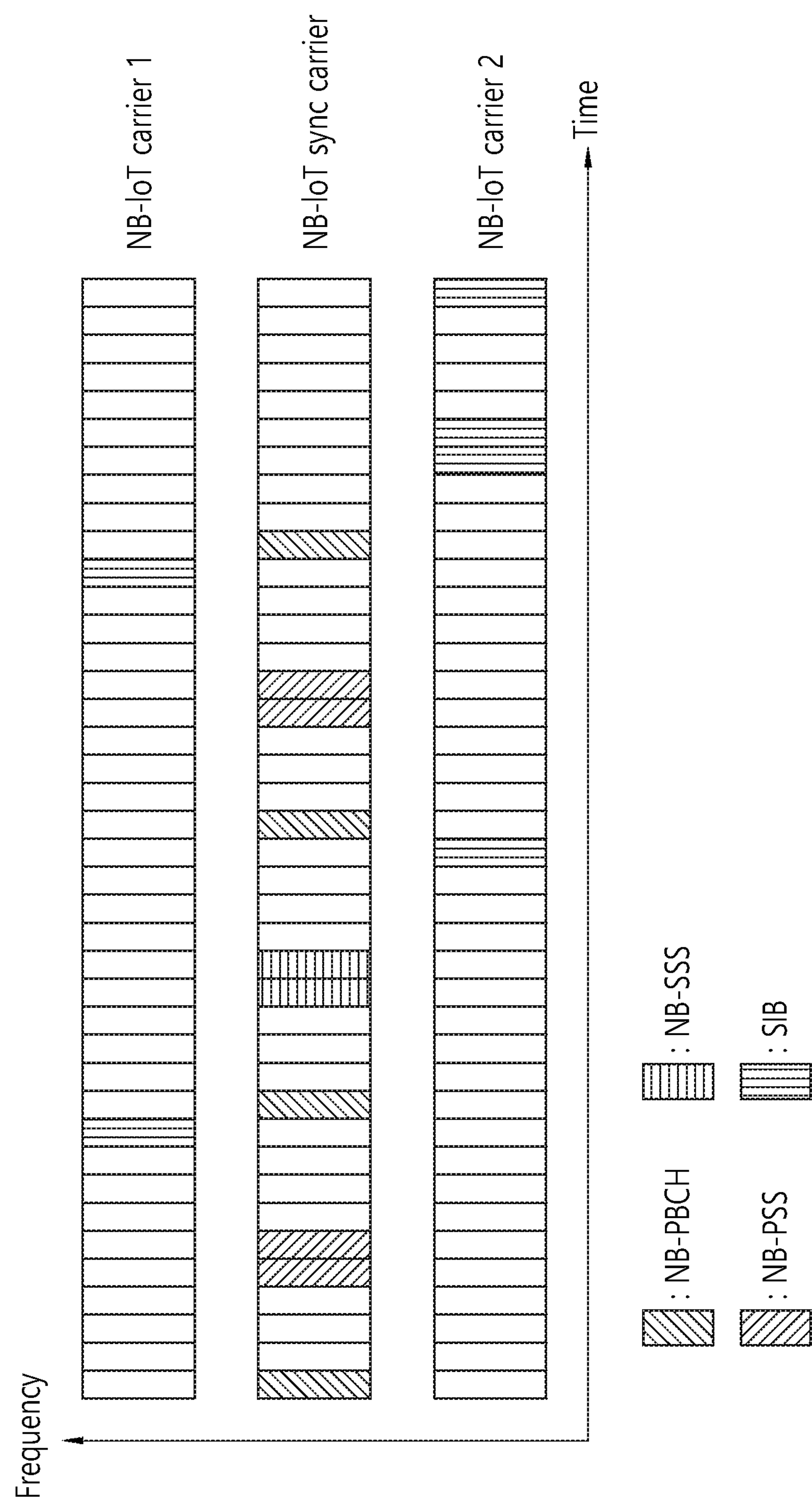
FIG. 8 shows an example of SIB transmission according to an embodiment of the present invention.

FIG. 8 shows an example of SIB transmission according to an embodiment of the present invention. To maximize frequency diversity and power boosting effect, SIB transmission may occur in different NB-IoT carrier(s) which are not overlapped with NB-PSS/NB-SSS/NB-PBCH transmissions in time. Referring to FIG. 8, SIB is transmitted in NB-IoT carrier 1 and 2, which is different from NB-IoT synchronization carrier. Further, SIB transmission and NB-PSS/NB-SSS/NB-PBCH transmission do not overlap with each other in time.

Figure 9:
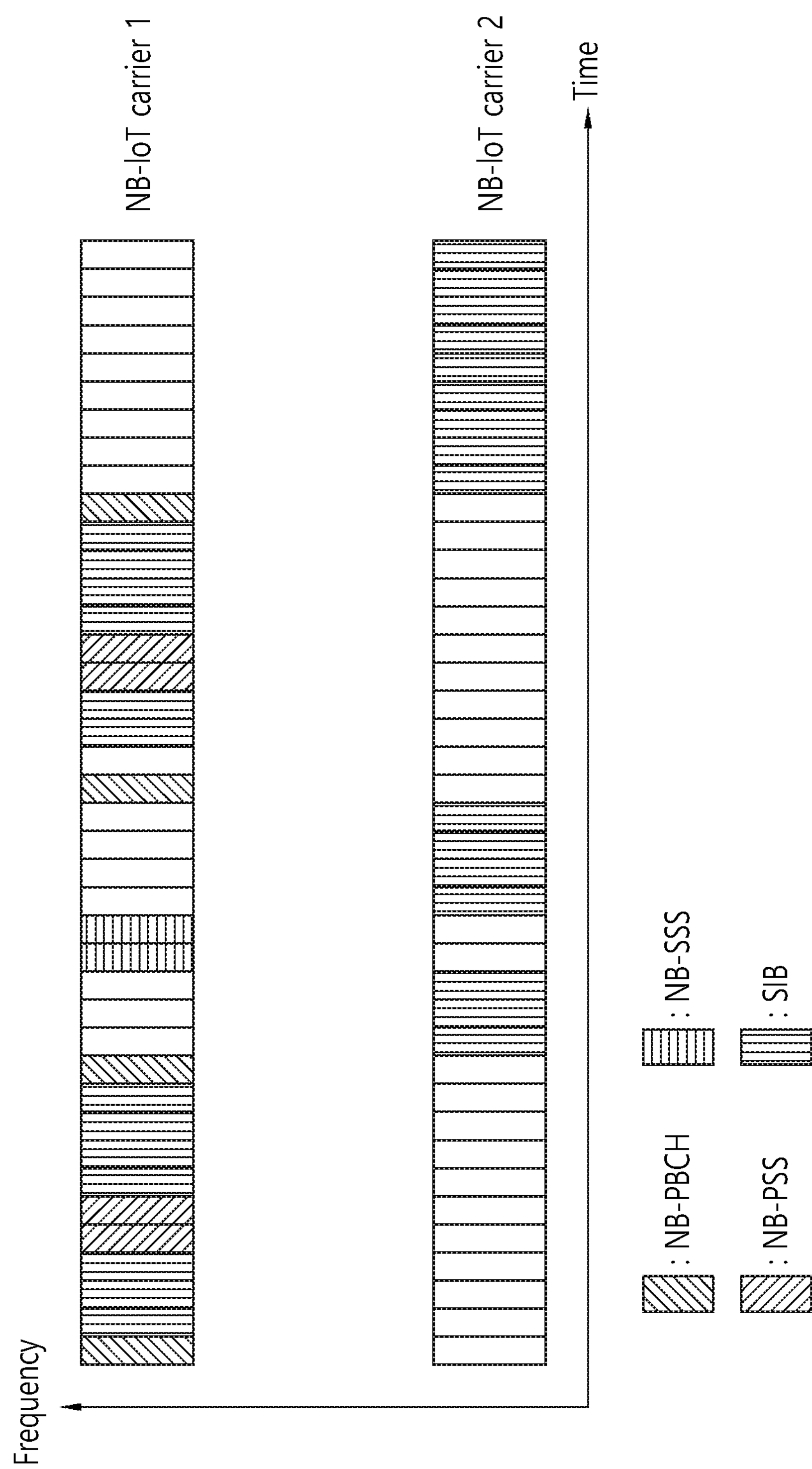
FIG. 9 shows another example of SIB transmission according to an embodiment of the present invention.

FIG. 9 shows another example of SIB transmission according to an embodiment of the present invention. If only two frequencies are available (e.g. guard band), SIB and NB-PSS/NB-SSS/NB-PBCH may be transmitted at the same frequency. More specifically, in guard band, two NB-IoT carrier may be defined in each edge where one carrier can carry synchronization signals. As two carriers are used at the same time, the power may be split. In that sense, in guard band, only one NB-IoT carrier is used at least for NB-PBCH/NB-PSS/NB-SSS/SIB transmission. In other words, if there is transmission in one NB-IoT carrier for synchronization signal or SIB, the other NB-IoT carrier may not be used for any transmission.

7. TBS Computation in in-Band Operation

In in-band operation, data may be rate-matched around invalid subframes, a first few 01-DM symbols in valid subframes, and legacy CRS REs. Determining TBS in in-band operation may need to take those unavailable REs into account. In total, there is 168 REs available in stand-alone operation, and by excluding RS, it becomes 144 REs. In in-band operation, it may be reduced to around 100 REs, which is about 70% of that of stand-alone operation. Thus, 0.7 (or 0.75 or some other predefined parameter depending on the overall overhead or semi-statically configured scaling factor) may be multiplied in TBS table for stand-alone/guard band for in-band operation. In other words, the reduced REs in in-band operation may be accounted in TBS computation.

8. Handling Different Number of Repetitions in in-Band Operation and Stand-Alone Operation Due to power difference, the required number of repetitions in in-band operation and standalone operation may be different from each other. To handle this issue, the frame size of in-band operation may be expanded to the required amount of repetitions compared to stand-alone operation. For example, if 4 times of repetition is necessary for in-band operation, 4 times of frame length may be used for in-band operation. That is, consecutive 4 valid subframes may be treated as one valid subframe in stand-alone operation in terms of data mapping. Within 4 valid consecutive subframes in in-band operation, the same data may be mapped including RS scrambling/data scrambling Channel estimation may occur over those subframes, and the constant power (if possible) may be used across those subframes. Also, same precoding may be used across those subframes.

9. UL Subcarrier Spacing

Variable DL subcarrier spacing may be considered depending on the operation, e.g. stand-alone operation with 3.75 kHz. It is desirable to align the subcarrier spacing between UL and DL. Thus, in terms of options of UL subcarrier spacing, the following options may be considered.

- Same as DL subcarrier spacing
- Higher layer signal which is configured by the network (e.g. subcarrier spacing index (e.g., 2.5 kHz, 3.75 kHz, 7.5 kHz, 15 kHz))
- Depending on the operation, e.g. 2.5 kHz in stand-alone operation or 15 kHz in in-band operation
- Depending on duplex, e.g. 15 kHz in TDD or 2.5 kHz in FDD
- A combination of the above options.

10. RACH Semi-Persistent Scheduling (SPS)

It is expected that a NB-LTE UE will trigger PRACH procedure after waking up to transmit periodic data. Since it is expected to have periodic transmission, a code may be assigned to a NB-LTE UE with transmission time occasion. For example, transmission time occasion may be period and offset and possibly frequency location. A NB-LTE UE at initial setup may send the expected period where the transmission will occur (or the network configures the period), then the network may configure the preamble code and timing information to avoid contention by multiple UEs. With this, a NB-LTE UE may initiate PRACH procedure without contention. If this is used, to maintain the status of a NB-LTE UE, it may be required that the NB-LTE UE transmits PRACH preamble at the determined location regardless of whether it has any data to transmit.

In other words, a NB-LTE UE may be configured with periodic PRACH transmission with higher-layer configured preamble code, periodicity, frequency location, and/or the repetition number. If the repetition number changes, the NB-LTE UE may go through contention-based PRACH procedure to inform the network about the change of coverage level. In the periodic PRACH transmission, which is configured mainly to support periodic report application, a NB-LTE UE may be supposed to transmit PRACH preamble regardless of whether actual traffic exists. If the NB-LTE UE has any UL transmission, the NB-LTE UE may send buffer status report (BSR) along with PRACH preamble. When the NB-LTE UE wakes up due to the event of UL traffic arrival, there may be a threshold T which may be used to determine whether the NB-LTE UE shall use PRACH SPS resource or contention-based PRACH resource. If the next available PRACH SRS opportunity is too far (i.e. Next_T−current_time>T), the NB-LTE UE may initiate contention-based PRACH.

SPS PRACH configuration may be configured along with discontinuous reception (DRX) configuration. Since it becomes a big challenging to maintain SPS configuration after a UE switches to RRC_IDLE, SPS PRACH configuration may be configured or valid only to UEs in RRC_CONNECTED including UEs in DRX. Alternatively, if the network supports context caching even in UEs in RRC_IDLE, SPS PRACH configuration may be valid also for UEs in RRC_IDLE. In that case, the NB-LTE UE may informed whether the SPS PRACH configuration will be valid after wake-up from RRC_IDLE. For this, semi-RRC_IDLE state, where a NB-LTE UE may assume that some SPS PRACH configurations may be maintained, may be used.

The SPS PRACH configuration may have SPS PDCCH order, and all parameters configurable in the SPS PDCCH order may be semi-statically configured. Activation and/or release may also be considered, which may be done by transmitting SPS PDCCH order with some reserved fields to indicate activation or release.

Further, all of higher layer configuration may be done at the initial setup when first UL grant is scheduled or first PRACH preamble transmission occurs. For this, contention-based PRACH resource and dedicated PRACH resource may be separated in CDM/FDM/TDM manner.

11. Grouping Mechanisms

All these preconfigured scheduling requiring a dedicated resource per UE may add considerable burden on the network side to maintain all the resource configuration for all UEs. Maintaining or keeping C-RNTI for UEs in RRC_IDLE may also be very challenging due to the limited number of available C-RNTIs where it may accommodate about 60,000 UEs in RRC_IDLE and RRC_CONNECTED. Thus, it may be essential to support all these concepts in group-basis. For, group-RNTI configuration, the following parameters may be considered.

- 2 bits of coverage class: The first two bits may indicate the coverage class whether the NB LTE-UE belongs. When a NB-LTE UE changes its coverage class, the first two bits may also change.
- 3 or 4 bits of PRACH resource periodicity: A few bits may be used to classify NB LTE-UEs with different application types or traffic patterns. Instead of periodicity, application type may be used.

Overall, about 8 bits may be used for a group ID. Then, additional 16 bits may be used for C-RNTI. In terms of configuring a preconfigured resource pool, group ID may be used instead. Within a group, the resource that each NB LTE-UE can use may be determined based on C-RNTI or UE ID. For example, the resource for a group may be configured by:

A set of frequency locations, number of subcarriers used

Modulation and coding scheme (MCS)

A set of preamble codes

Periodicity of resource: This may indicate how often the resource becomes available.

Periodicity of transmission: This may indicate how often a UE can transmit using the resource. In general, this may be larger or equal to periodicity of resource.

Then, a set of resource blocks {Ri} may be defined such that R1={f1, p1}, R2={f2, p2}, Rn={fk, pm}, where f1, . . . , fk is the frequency location per each resource candidate, and p, . . . , pm is the resource within periodicity of transmission. For example, when periodicity of resource is 40 ms and periodicity of transmission is 160 ms, there may be four instances of resource periods within a transmission. In this case, m=4. If there are multiple preamble codes, the resource may be defined by R1={c1, f1, p1}, R2={c2, f1, p1}, . . . R1={cn, fk, pm}, where n is the number of preamble codes configured.

A NB-LTE UE may determine its resource as UE ID % 1 (1 is the number of resource blocks within the configured resource set). Since if two NB-LTE UEs have the same periodicity and collide with each other at one time and at the next time as well, it is necessary to have some randomization in terms of resource selection. Thus, a random number may be added which changes based on frame number or based on subframe number (or other time unit). For example, the above equation may be modified into (UE ID+Rand (frame) % 1) by the random number. To avoid any misalignment issue or sequence wrapping issue, instead of frame, floor (frame number at the start of period/periodicity of resource) during the same periodicity of resource may be used, instead of frame number. For example, during 160 ms (if the periodicity of resource is 160 ms), even if the frame number is changed, the used frame number may not be changed.

The group ID may be selected by a NB-LTE UE or configured by the network. When the NB-LTE UE selects the group ID, it may be signaled via PRACH procedure. To select the group ID, the network may signal the supported groups via SIB. The group may broadcast its periodicity of resource and periodicity of transmission, then the frequency/code resources may be configured separately via PRACH procedure.

When the network configures too little resource for a given group, it may create some collision. In that case, reconfiguration may be performed. However, reconfiguration of resource pool may become challenging as many UEs will be in RRC_IDLE. Thus, it is necessary to indicate the change of resource set via SIB such that a NB-LTE UE can read the changed resource configuration. Alternatively, resource update may be done through paging where a group paging to update the resource pool can be used.

Another mechanism to address congestion on a resource pool may be to configure dynamic resource in addition to the semi-statically configured resource. The dynamic resource allocation or UL grant may be done per group, which then can be used for a NB-LTE UE based on random selection. In other words, a set of additional resource may be dynamically configured and a NB-LTE UE may either select semi-statically configured or dynamically configured resource based on some probability function. Alternatively, the use of semi-statically configured resource pool may be granted via PRACH procedure. The LB-LTE UE which has granted to access semi-statically configured resource may use the resource to transmit any UL data. Other NB-LTE UEs may transmit UL grant based on dynamic UL grant and/or PRACH procedure.

12. SSS Design

SSS may require to convey at least one of following information.

Cell ID

Frame index where SSS has been transmitted or the index or the order within a frame Indication of FDD or TDD Furthermore, the SSS may also indicate stand-alone operation, guard band or in-band operation or subcarrier spacing used for control signal/data/RS transmission. Since there are lots of information to carry in the SSS, two different SSS may be configured. For example, SSS1 may carry cell ID and SSS2 may carry the remaining information. To match between SSS1 and SSS2, SSS2 may be constructed based on SSS1. For example, root sequence between SSS1 and SSS2 may the same, and the cyclic shift used for SSS2 may be different from the cyclic shift used for SSS1 depending on the information. Alternatively, different length of sequences may be used for SSS1 and SSS2. Alternatively, cell ID may be divided between SSS1 and SSS2 (similar to current LTE PSS/SSS) and SSS may carry further information depending on the relative location between SSS1 and SSS2, also scrambling of SSS2. In other words, a short sequence of PSS may be transmitted mainly for time/frequency synchronization. In additional, SSS1 and SSS2 may be transmitted in a similar way to LTE. When a short sequence of PSS is transmitted, a short sequence may be transmitted in OFDM symbols without any potential legacy CRS.

13. CP Length:

Considering relatively large timing error of NB-LTE UEs, CP length for NB-LTE

UEs may be increased. In that sense, even with normal CP in-band operation, extended CP length may be used where the effective size of symbol can be reduced. Or, slightly larger CP length compared to normal CP may also be used.

14. NB-RS Assumption

As agreed, reference signal received power (RSRP) is at least necessary for NB-LTE UE measurement to select NB-PRACH resource set. It is natural to utilize NB-RS for RSRP measurement. In terms of NB-RS assumption from a UE perspective, it should be present even for UEs in RRC_IDLE. Thus, NB-RS may be transmitted in every subframe which is valid from NB-LTE UE perspective. Particularly in in-band operation, this, however, may increase the overhead of transmitting NB-RS in every valid subframe regardless of the density of NB-LTE UEs. For addressing the potential inefficiency, it may be assumed that subframes where NB-PBCH is carried also carry NB-RS (i.e. 1 subframe in every radio frame). Additionally, it may be assumed that subframe #4 may carry also NB-RS (assuming subframe #4 is used to transmit NB-SIB1), regardless of operation mode for the anchor PRB or NB-IoT carrier where synchronization signals have been received. For the measurement, at least subframe #0 and #4 may be assumed to transmit NB-RS in the anchor NB-IoT carrier. The similar principle may be applicable to paging and other SIB transmissions. In other words, NB-LTE UEs including IDLE UEs may assume that subframes carrying NB-PBCH, NB-SIBs and paging also carry NB-RS for the anchor PRB.

When a NB-LTE UE is configured to a different PRB, the NB-LTE UE may assume that NB-RS will be transmitted in every subframe which is configured for NB-PDCCH monitoring and/or PDSCH reception for either anchor PRB or different PRB. For different PRB from the anchor PRB, it may be assumed that subframe #0 and #4 carry NB-RS regardless of whether the subframes are configured for NB-PDCCH monitoring and/or PDSCH reception. Otherwise, depending on configuration of NB-PDCCH starting subframe set, the frequency of NB-RS transmission for RSRP measurement may be too low. Further, UEs may not assume that NB-RS is transmitted in a subframe which is not configured as a valid subframe if valid subframe is configured.

In summary, it may be proposed that at least subframe #0 and #4 in each NB-IoT carrier (regardless of the anchor or not) carry NB-RS. In other subframes, NB-RS may be assumed to be present if any transmission is potentially expected unless the subframe is configured as invalid subframe.

Further, when a NB-LTE UE is configured with different PRBs from the anchor PRB or NB-IoT carrier where synchronization signal has been received, it is necessary to configure power offset of NB-RS transmission compared to NB-RS transmission in the anchor NB-IoT carrier. This is necessary as the NB-LTE UE may determine NB-PRACH resource based on threshold configured based on NB-RS power in the anchor NB-IoT carrier. Thus, the power offset needs to be applied for RSRP measurement/threshold for NB-PRACH resource set determination if a NB-LTE UE is configured with different NB-IoT carrier and performs RSRP measurement in the different PRB from the anchor PRB.

15. Radio Resource Management (RRM) Measurement/Radio Link Management (RLM) Measurement For RRM measurement, if aperiodic channel state information (CSI) report is not supported, means to indicate the change of coverage level or RSRP seems necessary, at least for NB-LTE UEs with good coverages and/or have relatively high data rate. If RRM measurement report is not supported, RACH procedure may be triggered when RSRP or coverage level changes. However, the reporting of RSRP may be considered which can be triggered aperiodically.

For RLM measurement, RLM based on NB-PDCCH may be necessary. If RLM is supported, it is necessary to determine whether repetition of NB-PDCCH is considered, and if so, which repetition level is used. To get meaningful measurement, RLM measurement needs to be performed over the repetition, and it may be based on the maximum repetition number of NB-PDCCH configured to the UE. When RLF occurs, a NB-LTE UE may inform the higher layer.

Figure 10:
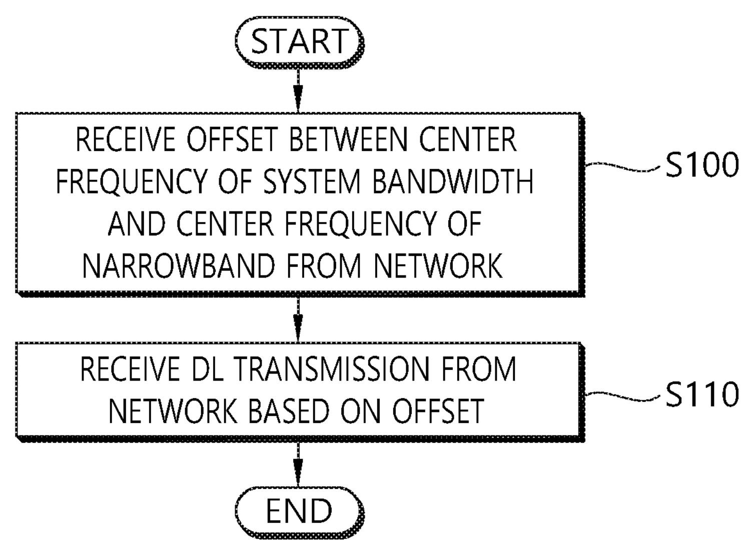
FIG. 10 shows a method for receiving DL transmission according to an embodiment of the present invention.

FIG. 10 shows a method for receiving DL transmission according to an embodiment of the present invention. At least one of embodiments of the present invention described above may be applied to this embodiment of the present invention.

In step S100, the NB-LTE UE receives an offset between a center frequency of a system bandwidth and a center frequency of a narrowband from a network. The narrowband may be a bandwidth in which at least one of NB-PBCH/NB-PSS/NB-SSS is transmitted. A location of the at least one of the NB-PBCH/NB-PSS/NB-SSS may not be fixed for the center frequency of the system bandwidth.

In step S110, the NB-LTE UE receives the DL transmission from the network based on the offset. The DL transmission may correspond to a PDCCH for the NB-LTE UE or PDSCH for the NB-LTE UE. A legacy CRS may be used for the PDCCH/PDSCH for the NB-LTE UE. Scrambling of the legacy CRS may change based on a location of the narrowband.

Further, the NB-LTE UE may receive a NB-RS in a subframe. The subframe in which the NB-RS is received may carry at least one of NB-PBCH), NB-SIB or a narrowband paging.

Figure 11:
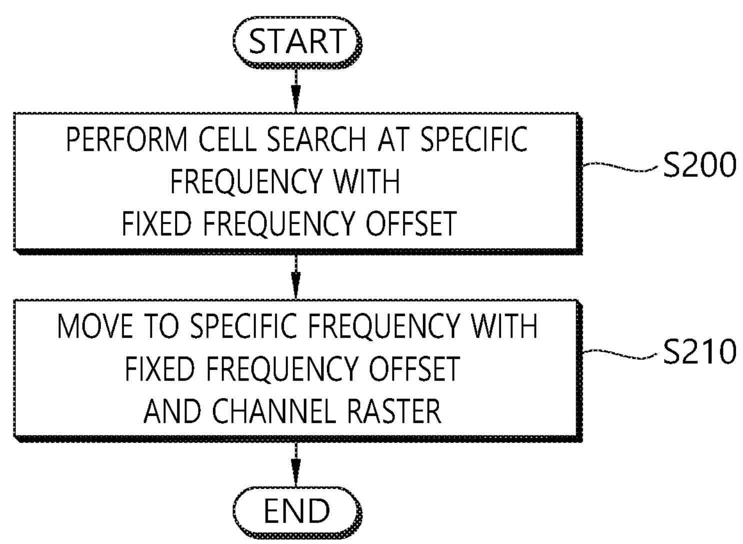
FIG. 11 shows a method for performing a cell search according to another embodiment of the present invention.

FIG. 11 shows a method for performing a cell search according to another embodiment of the present invention. At least one of embodiments of the present invention described above may be applied to this embodiment of the present invention.

In step S200, the NB UE performs the cell search at a specific frequency with a fixed frequency offset. In step S210, the NB UE moves to the specific frequency with the fixed frequency offset and a channel raster.

The channel raster may be set as 100 kHz. In this case, the fixed frequency offset may be set as one of 180 kHz*3 or 180 kHz*3+90 kHz. Or, the fixed frequency offset may be set as 7.5 kHz. The channel raster may be changed into 10 kHz or multiple of 90 kHz. Performing the cell search may include searching PSS/SSS. A fixed narrowband in the specific frequency may be configured for the NB UE.

Figure 12:
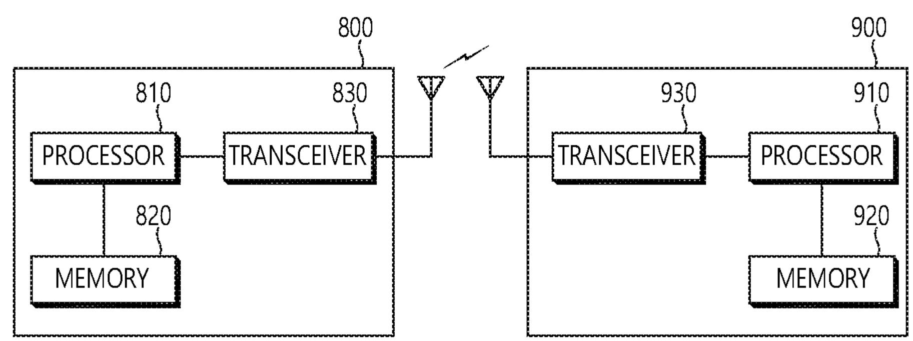
FIG. 12 shows a wireless communication system to implement an embodiment of the present invention.

FIG. 12 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A NB-LTE UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a narrowband internet of things (NB-IoT) user equipment (UE) in a wireless communication system, the method comprising:

receiving, from a network, information on NB-IoT region, wherein the information on NB-IoT region includes an offset between a center frequency of a system bandwidth and a center frequency of a narrowband, and the information on NB-IoT region includes size of guard bands;

receiving, from the network, a notification notifying that data is transmitted on the guard bands;

upon receiving the notification, monitoring the guard bands; and receiving a physical broadcast channel (PBCH) for the NB-IoT, a primary synchronization signal (PSS) for the NB-IoT and a secondary synchronization signal (SSS) for the NB-IoT from the network on only one of the guard bands based on the size of the guard bands, wherein the guard bands are defined in both edges of the system bandwidth.

2. The method of claim 1, wherein a location of at least one of the PBCH, PSS or SSS for the NB-IoT is not fixed for the center frequency of the system bandwidth.

3. The method of claim 1, wherein the DL transmission is related to a physical downlink control channel (PDCCH) for the NB-IoT or a physical downlink shared channel (PDSCH) for the NB-IoT.

4. The method of claim 3, wherein a legacy cell-specific reference signal (CRS) is used for the PDCCH for the NB-IoT or the PDSCH for the NB-IoT.

5. The method of claim 4, wherein scrambling of the legacy CRS changes based on a location of the narrowband.

6. The method of claim 1, wherein receiving the DL transmission comprises receiving a narrowband reference signal (NB-RS) in a subframe.

7. The method of claim 6, wherein the subframe in which the NB-RS is received carries at least one of a narrowband physical broadcast channel (NB-PBCH), a narrowband system information block (NB-SIB), or a narrowband paging.

8. A narrowband internet of things (NB-IoT) user equipment (UE) in a wireless communication system, the NB UE comprising:

a memory;

a transceiver; and a processor, coupled to the memory and the transceiver, that:

controls the transceiver to receive, from a network, information on NB-IoT region, wherein the information on NB-IoT region includes an offset between a center frequency of a system bandwidth and a center frequency of a narrowband, and the information on NB-IoT region includes size of guard bands, controls the transceiver to receive, from the network, a notification notifying that data is transmitted on the guard bands, upon receiving the notification, monitor the guard bands; and controls the transceiver to receive a physical broadcast channel (PBCH) for the NB-IoT, a primary synchronization signal (PSS) for the NB-IoT and a secondary synchronization signal (SSS) for the NB-IoT from the network only on one of the guard bands based on the size of the guard bands, wherein the guard bands are defined in both edges of the system bandwidth.

9. The UE of claim 8, wherein a location of at least one of the PBCH, PSS or SSS for the NB-IoT is not fixed for the center frequency of the system bandwidth.

10. The UE of claim 8, wherein the DL transmission is related to a physical downlink control channel (PDCCH) for the NB-IoT or a physical downlink shared channel (PDSCH) for the NB-IoT.

11. The UE of claim 10, wherein a legacy cell-specific reference signal (CRS) is used for the PDCCH for the NB-IoT or the PDSCH for the NB-IoT.

12. The UE of claim 11, wherein scrambling of the legacy CRS changes based on a location of the narrowband.

* * * * *